(12) United States Patent
Rosengard et al.

(10) Patent No.: US 7,013,318 B2
(45) Date of Patent: Mar. 14, 2006

(54) METHOD AND SYSTEM FOR ENCAPSULATING CELLS

(75) Inventors: Phillip I. Rosengard, Potomac Falls, VA (US); Marwan M. Krunz, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 472 days.

(21) Appl. No.: 10/158,351

(22) Filed: May 29, 2002

(65) Prior Publication Data

US 2004/0022260 A1 Feb. 5, 2004

(51) Int. Cl.
G06F 17/30 (2006.01)
G06F 7/00 (2006.01)
G06F 17/00 (2006.01)
G06F 12/00 (2006.01)

(52) U.S. Cl. ............... 707/504; 370/395.1; 370/517
(58) Field of Classification Search ............... 707/504, 707/10; 370/474, 349, 230.1, 395.1, 517; 710/52
See application file for complete search history.

(56) References Cited

U.S. PATENT DOCUMENTS

| | | | |
|---|---|---|---|
| 5,537,408 A | 7/1996 | Branstad et al. ............... 370/79 |
| 5,648,969 A * | 7/1997 | Pasternak et al. ............ 370/349 |
| 5,699,369 A | 12/1997 | Guha ............................ 371/41 |
| 5,727,051 A | 3/1998 | Holender ..................... 379/112 |
| 5,764,740 A | 6/1998 | Holender ..................... 379/112 |
| 5,768,527 A | 6/1998 | Zhu et al. ............... 395/200.61 |
| 5,850,385 A | 12/1998 | Esaki ........................... 370/216 |
| 5,867,494 A | 2/1999 | Krishnaswamy et al. ... 370/352 |
| 5,867,663 A | 2/1999 | McClure et al. ....... 395/200.64 |
| 5,872,918 A | 2/1999 | Malomsoky et al. ..... 395/200.5 |
| 5,991,276 A | 11/1999 | Yamamoto ................... 370/260 |
| 5,999,525 A | 12/1999 | Krishnaswamy et al. ... 370/352 |
| 6,005,599 A | 12/1999 | Asai et al. ...................... 348/7 |
| 6,005,851 A | 12/1999 | Craddock et al. ........... 370/329 |
| 6,028,933 A | 2/2000 | Heer et al. ...................... 380/9 |
| 6,038,217 A | 3/2000 | Lyles .......................... 370/233 |
| 6,041,051 A | 3/2000 | Doshi et al. ................. 370/352 |
| 6,055,242 A | 4/2000 | Doshi et al. ................. 370/458 |
| 6,064,650 A | 5/2000 | Kappler et al. ............. 370/232 |
| 6,064,651 A | 5/2000 | Rogers et al. .............. 370/233 |
| 6,064,677 A | 5/2000 | Kappler et al. ............. 370/414 |

(Continued)

FOREIGN PATENT DOCUMENTS

WO 98/47293 10/1998

OTHER PUBLICATIONS

Pending Patent Application; U.S. Appl. No. 10/051,539; entitled "Compressing Cell Headers For Data Communication," by Phillip I. Rosengard, 41 total pages, Jan. 16, 2002.

*Primary Examiner*—Anthony Knight
*Assistant Examiner*—Sunray Chang
(74) *Attorney, Agent, or Firm*—Baker Botts l.l.P.

(57) ABSTRACT

Encapsulating cells includes receiving cells at a queue associated with decision points. Each decision point corresponds to a number of cells and is associated with a threshold criterion. The following operations are repeated until a threshold criterion is satisfied. A number of cells corresponding to a decision point are accumulated at the queue. Jitter associated with the cells at the queue is predicted, and it is determined whether the predicted jitter satisfies the threshold criterion associated with the decision point. If the predicted jitter satisfies the threshold criterion, the cells are sent to a buffer coupled to the queue. Otherwise, the cells continue to be accumulated at the queue. The cells in the buffer are encapsulated.

20 Claims, 4 Drawing Sheets

U.S. PATENT DOCUMENTS

| | | | |
|---|---|---|---|
| 6,075,787 A | 6/2000 | Bobeck et al. | 370/395 |
| 6,085,252 A | 7/2000 | Zhu et al. | 709/231 |
| 6,088,368 A | 7/2000 | Rubinstain et al. | 370/480 |
| 6,148,005 A | 11/2000 | Paul et al. | 370/469 |
| 6,181,711 B1 | 1/2001 | Zhang et al. | 370/468 |
| 6,198,723 B1 * | 3/2001 | Parruck et al. | 370/230.1 |
| 6,233,226 B1 | 5/2001 | Gringeri et al. | 370/252 |
| 6,519,595 B1 * | 2/2003 | Rose | 707/10 |
| 6,618,397 B1 * | 9/2003 | Huang | 370/474 |
| 6,684,273 B1 * | 1/2004 | Boulandet et al. | 710/52 |
| 6,728,209 B1 * | 4/2004 | Pate et al. | 370/230.1 |
| 2003/0118053 A1 * | 6/2003 | Edsall et al. | 370/474 |

* cited by examiner

US 7,013,318 B2

METHOD AND SYSTEM FOR ENCAPSULATING CELLS

GOVERNMENT FUNDING

The U.S. Government may have certain rights in this invention as provided for by the terms of Grant No. F04701-97-C-0044 awarded by Electronic Systems Division/Air Force Material Command (ESD/AFMC).

TECHNICAL FIELD OF THE INVENTION

This invention relates generally to the field of data communication and more specifically to a method and system for encapsulating cells.

BACKGROUND OF THE INVENTION

Encapsulating cells in a communication system may involve the use of multiple queues for buffering cells waiting to be encapsulated. Cells at different queues, however, may experience different waiting times prior to encapsulation, also known as cell delay variation. Cell delay variation may introduce unwanted jitter into the communication system. Moreover, encapsulation according to known techniques may result in sub-optimal bandwidth usage of a communications channel. Consequently, encapsulating cells while controlling jitter and enhancing bandwidth utilization has posed challenges.

SUMMARY OF THE INVENTION

In accordance with the present invention, disadvantages and problems associated with previous techniques for encapsulation of cells in data communication may be reduced or eliminated.

According to one embodiment of the present invention, encapsulating cells includes receiving cells at a queue associated with decision points. Each decision point corresponds to a number of cells and is associated with a threshold criterion. The following operations are repeated until a threshold criterion is satisfied. A number of cells corresponding to a decision point are accumulated at a queue. Jitter associated with the cells at the queue is predicted, and it is determined whether the predicted jitter satisfies the threshold criterion associated with the decision point. If the predicted jitter satisfies the threshold criterion, the cells are sent to another buffer coupled to the queue. Otherwise, the cells continue to be accumulated at the queue. The cells in the buffer are encapsulated if certain criteria are satisfied.

Certain embodiments of the invention may provide one or more technical advantages. A technical advantage of one embodiment may be that the number of cells to be encapsulated is adjusted in response to predicted jitter, which may serve to control jitter while maintaining efficiency. If the predicted jitter is high, fewer cells are encapsulated in an effort to control jitter. If the predicted jitter is too low, more cells are encapsulated to maintain efficiency. Another technical advantage of one embodiment may provide prediction of jitter by estimating the number of cells at a buffer at a given time. If the predicted number of cells is high, the jitter is predicted to be high. If the predicted number of cells is low, then the jitter is predicted to be low.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
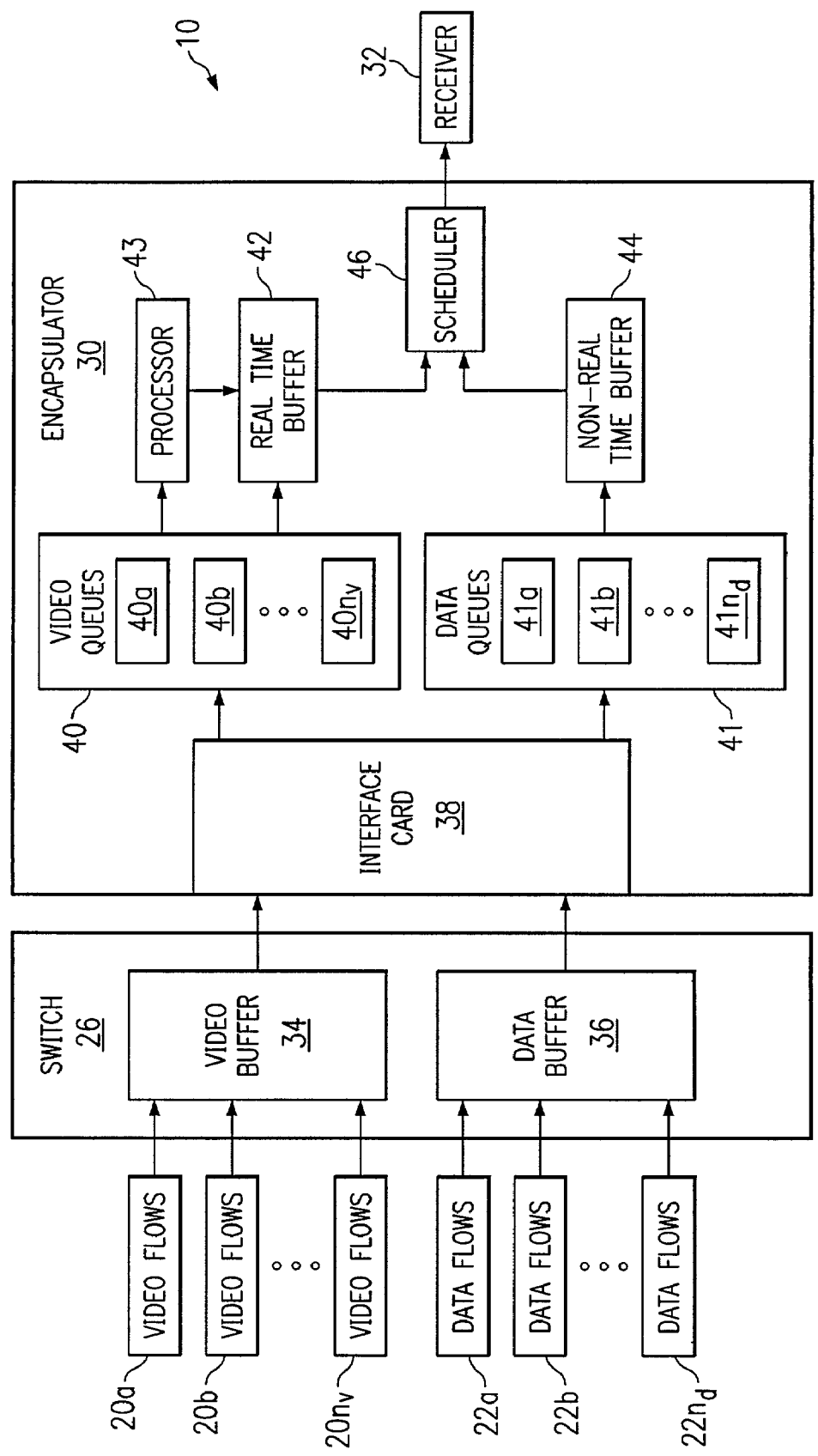
FIG. 1 illustrates a system for encapsulating cells to form encapsulation sections.

FIG. 1 illustrates a system 10 for encapsulating cells to form encapsulation sections. System 10 adjusts the number of cells waiting to be encapsulated at a queue in response to predicted jitter, which depends on the number of cells waiting to be encapsulated at other queues. By adjusting the number of cells to be encapsulated, system 10 may control jitter while maintaining efficiency. In general, encapsulating a smaller number of cells reduces jitter, while encapsulating a larger number of cells improves efficiency. System 10 predicts jitter and adjusts the number of cells to be encapsulated in order to reduce jitter while maintaining efficiency.

System 10 receives cells from video flows 20 and data flows 22, encapsulates the received cells to form encapsulation sections, fragments the encapsulation sections into packets and transmits the packets to a receiver 32. A cell comprises a fixed-size packet. For example, a cell may comprise an asynchronous transfer mode (ATM) cell having a 48-octet payload and a 5-octet header. Video flows 20 transmit video traffic, and data flows 22 transmit data traffic. According to one embodiment, video flows 20 may comprise ATM permanent virtual circuits (PVCs), and data flows 22 may comprise ATM PVCs. Flows that transmit other types of traffic such as voice traffic or other real-time traffic may be used in place of or in addition to video flows 20.

System 10 may receive any suitable type of traffic, for example, moving pictures experts group-2 (MPEG-2) or MPEG-4 video traffic, voice over Internet protocol (VOIP) or Internet protocol (IP) packet traffic, or serial stream data carried in ATM cells. The traffic may be classified according to jitter tolerance. According to one embodiment, traffic that is jitter tolerant comprises data traffic, and traffic that is not jitter tolerant comprises video traffic. Jitter tolerant traffic, however, may comprise any traffic that is jitter tolerant according to any suitable definition of "jitter tolerant," and jitter intolerant traffic may comprise any traffic that is not jitter tolerant. For example, jitter intolerant traffic may include voice traffic.

System 10 includes a switch 26 and an encapsulator 30. Switch 26 receives cells from video flows 20 and from data flows 22 and sends cells to encapsulator 30. Switch 26 may comprise an asynchronous transfer mode (ATM) switch. Switch 26 includes a video buffer 34 and a data buffer 36. Video buffer 34 receives cells from video flows 20, and data buffer 36 receives cells from data flows 22. Switch 26 may implement a scheduling priority that favors the jitter intolerant traffic from video flows 20 over the jitter tolerant traffic from data flows 22.

Encapsulator 30 generates encapsulation sections from cells received from switch 26. Encapsulator 30 includes an interface card 38, video queues 40, data queues 41, a processor 43, a real time buffer 42, a non-real time buffer 44, and a scheduler 46. Interface card 38 buffers cells received from switch 26, and transmits the cells to video queues 40 and data queues 42. Interface card 38 may comprise, for example, an asynchronous transfer mode (ATM) network interface card.

Video queues 40 buffer video traffic, and data queues 41 buffer data traffic. Each video queue 40 stores video traffic sent from a video flow 20 associated with the video queue 40. According to one embodiment, queues that queue other types of traffic such as voice traffic or other real-time traffic may be used in place of or in addition to video queues 40. Similarly, each data queue 41 stores data traffic sent from a data flow 22 associated with the data queue 41. As used in this document, "each" refers to each member of a set or each member of a subset of the set.

Processor 43 manages the encapsulation process. When the number of cells at a video queue 40 reaches a threshold value, the cells are formed into an encapsulation section. Processor 43 determines the target value in response to predicted jitter, which depends in part on the number of packets at real time buffer 42. Jitter is measured by calculating the cell delay variation between the input to switch 26 and the input to receiver 32. Data queues 41 may form encapsulation sections from the data cells in a similar manner or in another suitable manner.

Encapsulation sections from queues 40 and 41 are packetized into packets. Packets of video encapsulation sections are copied into real time buffer 42, and packets of data encapsulation sections are copied into non-real time buffer 44. The packets of an encapsulation section may be copied sequentially into real time buffer 42 or non-real time buffer 44 such that the packets are not interleaved by packets of another encapsulation section. An example of a packetized encapsulation section is described with reference to FIG. 2. According to one embodiment, buffers that buffer other types of traffic such as voice traffic or other real-time traffic may be used in place of or in addition to real time buffer 42.

Scheduler 46 outputs video encapsulation sections from real time buffer 42 and data encapsulation sections from non-real time buffer 44. Real time buffer 42 may be given scheduling priority over non-real time buffer 44 such that packets are transmitted from non-real time buffer 44 only if real time buffer 42 is empty. Accordingly, non-real time buffer 44 is sufficiently large to store delayed data encapsulation sections. Real time buffer 42 and non-real time buffer 44 may process the packets according to a first-in-first-out procedure.

To summarize, system 10 encapsulates cells to form encapsulation sections. The number of cells to be encapsulated at each video queue 40 is adjusted in response to predicted jitter, with the goal of reducing jitter while maintaining efficiency. Jitter may be measured by calculating cell delay variation, to be described with reference to FIG. 3. A method for determining when to encapsulate cells is described with reference to FIG. 4. Predicting cell delay variation involves calculating the number of packets predicted to be at real time buffer 42, to be described with reference to FIG. 5. The encapsulation sections are fragmented into packets, which are transmitted to receiver 32. Cells and packets comprise fixed-size packets, where the size of a cell may differ from the size of a packet.

The following parameters may be used to perform calculations described in the examples illustrated with reference to FIGS. 3 through 5.

| Parameter | Definition |
|---|---|
| n | Total number of flows 20 and 22 |
| $n_v$ | Number of video flows 20 |
| $n_d$ | Number of data flows 22 |
| $M_i(k)$ | Number of cells in the kth encapsulation section 200 of the ith flow |
| $CDV_{sw}$ | Worst-case cell delay variation for video traffic at switch 26 |
| $R_{sw}$ | Switching capacity of an output port of switch 26, in bits per second |
| $CDV_{card}$ | Worst-case cell delay variation for video traffic up to interface card 38 within encapsulator 30 |
| $R_{card}$ | Processing capacity of interface card 38, in bits per second |
| $D^{(i)}_{card}$ | Worst-case interdeparture time for two successive cells of the ith video flow 20 |
| $R_{encap}$ | Rate of encapsulator 30, in bits per second |
| $M_j$ | Size of the payload portion of an encapsulation section from the jth video flow 20 |
| $CDV_{encap}$ | Worst-case positive cell variation up to and including encapsulator 30 |
| $R_i$ | Allocated bandwidth to the ith video flow 20, in bits per second |
| $\eta(M)$ | Bandwidth efficiency for an encapsulation section of size M |
| $M_{high} = \eta_{opt}(M)$ | Optimal size of a payload portion |
| $M_{med}$ | Size of a payload portion at a first decision point |
| $M_{low}$ | Size of a payload portion at a second decision point |
| $m_{tot}$ | Total number of cells in $n_v$ video queues 40 |
| $m_i$ | Number of cells in the ith video queue 40, i = 1, . . . , $n_v$ |
| $Q_{RT}$ | Number of packets in the real time buffer 42 |

Figure 2:
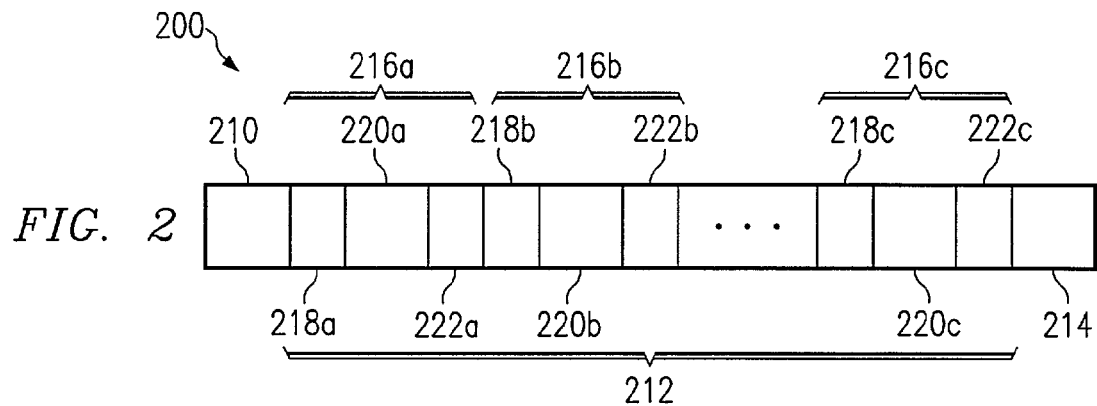
FIG. 2 illustrates a packetized encapsulation section.

FIG. 2 illustrates a packetized encapsulation section 200. Encapsulation section 200 includes a section header 210, section data 212, and a section footer 214. Section header 210 may include, for example, digital video broadcasting (DVB) Multi-Protocol Encapsulation (MPE) header data. Section data 212 includes packets 216. According to one embodiment, encapsulation section 200 may comprise a multi-protocol encapsulation (MPE) section. A packet 216 includes a packet header 218, packet data 220, and a packet footer 222. Packet data 220 includes cells. Section footer 214 may include, for example, error correction codes. According to one embodiment, each packet 216 may comprise a 204-byte MPEG-2 packet. Packet header 218 has eight bytes, packet data 220 has 104 bytes, packet footer 222 has eight bytes, and four bytes are used for control purposes.

According to one embodiment, header compression may be used when encapsulating the cells. The header of each cell is removed and the payload of the cell is inserted into packet data 220. Relevant information from the cell header is encoded into a control cell of the encapsulation section 200.

Figure 3:
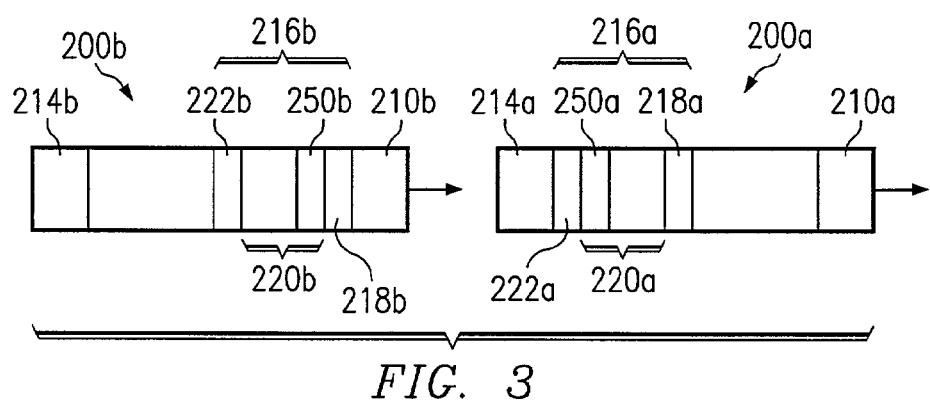
FIG. 3 illustrates encapsulation sections for which cell delay variation may be calculated.

FIG. 3 illustrates encapsulation sections 200 for which cell delay variation may be calculated. The equations presented in the illustrated example apply to an embodiment according to which ATM cells and MPEG-2 packets are used. Other equations, however, may be used for other embodiments according to which other cells or packets are used. According to one embodiment, encapsulation sections 200 are at the ith video queue 40, where i=1, . . . , $n_v$, referred to as queue i. Capacity $R_i$ is the bandwidth allocated to queue i. The worst-case cell delay variation $CDV_{sw}^{(i)}$ that queue i experiences at switch 26 may be described by Equation (1):

$$CDV_{sw}^{(i)} = 53 \times 8 \times n_v / R_{sw} = 424 n_v / R_{sw} \qquad (1)$$

where $R_{sw}$ is the switching capacity of an output port of switch 26. The next buffering stage occurs at interface card 38 of encapsulator 30.

The cell delay variation $CDV_{card}^{(i)}$ up to and including interface card 38 may be described by Equation (2):

$$CDV_{card}^{(i)} = 424 n_v / R_{card} \qquad (2)$$

where $R_{card}$ is the processing capacity of interface card 38. After leaving interface card 38, the worst-case interdeparture time $D_{card}^{(i)}$, or delay time, for two successive cells of flow i may be described by Equation (3):

$$D_{card}^{(i)} = 424 n_v / R_{card} + 424 / R_i \qquad (3)$$

The worst-case interdeparture time for two successive cells at the output of encapsulator 30 occurs when the first cell of two successive cells happens to be the last cell of the kth encapsulation section, while the second successive cell is the first one of the (k+1)th encapsulation section. In the illustrated example, first cell 250a is the last cell of kth encapsulation section 200a, and second cell 250b is the first cell of the (k+1)th encapsulation section 200b.

If the first bit of first cell 250a arrives at queue i at time t, the last bit of first cell 250a arrives at time $t + 424/R_{card}$. According to one embodiment, the time needed to compute header 210 and footer 214 for encapsulation section 200 and to insert cells 250 into encapsulation section 200 is assumed to be small compared to the waiting time of cells 250 at queue i. Similarly, the time needed to generate packet header 218 and packet footer 222 of packet 216 is assumed to be small. To compute the worst-case interdeparture time at the output of encapsulator 30, the difference between the earliest possible departure time for the last bit of first cell 250a and the latest possible departure time for the last bit of second cell 250b is computed.

Once the last bit of first cell 250a arrives at the queue i, header 210a and footer 214a for the kth encapsulation section 200a are computed, and encapsulation section 200a is packetized into the number of packets 216a given by Equation (4): Number of packets 216a in the kth encapsulation section $$200a = \left\lceil \frac{48 M_i(k) + 16}{184} \right\rceil \qquad (4)$$

where $\lceil \cdot \rceil$ is the ceiling function. If the cell headers are compressed, encapsulation section 200 includes $M_i(k)$ cells 250 having a control cell that describes the header information of subsequent cells 250 of encapsulation section 200 plus $M_i(k)-1$ cells with no headers. In the illustrated example, the 16-byte term in the numerator is the contribution of encapsulation section header 210 and footer 214, and the 184-byte in the denominator is the size of packet data 220 of packet 216.

In the best-case scenario, packets 216 of the kth encapsulation section 200a are immediately sent from encapsulator 30. Accordingly, the earliest possible departure time of the last bit of first cell 250a may be given by Equation (5):

Earliest departure time of last bit of first cell 250a $$250a = t + \frac{424}{R_{card}} + \frac{(8)(204) \left\lceil \frac{48 M_i(k) + 16}{184} \right\rceil}{R_{encap}} - \frac{(8)(16)}{R_{encap}} \qquad (5)$$

where $R_{encap}$ is processing capacity of encapsulator 30. The last term in the right-hand side of Equation (5) represents the time needed to transmit footer 214a and packet footer 222a of last packet 216a, which are transmitted after the last bit of first cell 250a.

In the worst case, the first bit of second cell 250b arrives at video queue 40 at time $D_{card}$ and the last bit arrives at time $t + D_{card} + 424/R_{card}$. Second cell 250b waits at queue i for the arrival of $M_i(1+k)-2$ additional cells to complete encapsulation section 200b. According to one embodiment, the $M_i(1+k)$ cells may include a control cell. Accordingly, the last bit of the last cell of the (1+k)th encapsulation section 200b becomes available in queue i at time $t + D_{card}(M_i(1+k)-1) + 424/R_{card}$. Once the last bit becomes available, the (1+k)th encapsulation section 200b may be constructed. The copying of newly formed packets 216 into real time buffer 42 and non real time buffer 44 is assumed to be done at a rate faster than $R_{encap}$.

In the worst case, the (1+k)th encapsulation section of queue i has to wait for the transmission of $n_v-1$ encapsulation sections from other queues j, where $j=1, \ldots, n_v$ and $j \neq i$ plus the transmission of packet 216 from non-real time buffer 44, due to the nonpreemptive nature of scheduler 46. $M_j$ indicates the generic size of an encapsulation section from queue j. The first bit of the (1+k)th encapsulation section 200b of queue i is transmitted from encapsulator 30 no later than as described by Equation (6):

Latest transmission time of the first bit of the (1+k)th encapsulation section 200b =

$$200b = t + D_{card}^{(i)}(M_i(1+k) - 1) + \qquad (6)$$
$$\frac{424}{R_{card}} + \frac{(8)(204) \sum_{j \neq i} \left\lceil \frac{48 M_j(k) + 16}{184} \right\rceil}{R_{encap}} + \frac{(204)(8)}{R_{encap}}$$

Within the (1+k)th encapsulation section, second cell 250b is preceded by header 218b of the first packet 216b, a control field of packet 216b, header 210b, and a control cell. According to one embodiment, packet header 218b comprises eight bytes, the control field comprises four bytes, header 210b comprises eight bytes, and the control cell comprises 48 bytes. The latest transmission time of the last bit of second cell 250b may be described by Equation (7):

Latest transmission time of last bit of second cell 250b =

$$250b = t + D_{card}^{(i)}(M_i(1+k) - 1) + \frac{424}{R_{card}} + \qquad (7)$$
$$\frac{(8)(204) \sum_{j \neq i} \left\lceil \frac{48 Mj + 16}{184} \right\rceil}{R_{encap}} + \frac{(204)(8)}{R_{encap}} + \frac{(116)(8)}{R_{encap}}$$

From Equations (5) and (7), the worst-case interdeparture time $D_{encap}^{(i)}$ at the output of encapsulator 30 may be described by Equation (8):

$$D_{encap}^{(i)} = D_{card}^{(i)}(M_i(1+k) - 1) + \qquad (8)$$
$$\frac{1632}{R_{encap}} \left[ \sum_{j \neq i} \left\lceil \frac{48 M_j + 16}{184} \right\rceil - \left\lceil \frac{48 M_i(k) + 16}{184} \right\rceil + 1.647 \right]$$

The worst-case cell delay variation $CDV_{encap}^{(i)}$ up to and including encapsulator 30 may be given by:

$$CDV_{encap}^{(i)} = D_{encap}^{(i)} = 424/R_i \qquad (9)$$

As an example, the worst-case situation occurs when the M-value is set to its maximum possible size for all encapsulation sections 200. In this case, Equation (8) reduces to Equation (10):

$$(D_{encap}^{(i)})_{static} = 84 D_{card}^{(i)} + \frac{1632}{R_{encap}} \{23(n_v - 2) + 1.647\} \quad (10)$$

$$= 84 D_{card}^{(i)} + \frac{1632}{R_{encap}} (23 n_v - 44.353)$$

When the (1+k)th encapsulation section 200b of queue i is to be encapsulated, the only factor of Equation (8) that may be controlled is $M_i(1+k)$. This may be used to reduce the worst-case cell delay variation.

Cell delay variation is negatively impacted by larger M-values. Reducing the M-value, however, may have an adverse effect on bandwidth efficiency since such reduction typically increases the relative overhead of encapsulation. To demonstrate this relationship, variable M is used to describe the M-value of a given encapsulation section 200. Bandwidth efficiency $\eta(M)$ is defined as the ratio between the number of payload bytes of an encapsulation section 200 and the total number of bytes used to transport encapsulation section 200 from encapsulator 30. According to one embodiment, the payload bytes refer to ATM traffic bytes at the input of encapsulator 30 that are needed to generate an encapsulation section 200. Accordingly, bandwidth efficiency may be calculated using Equation (11):

$$\eta(M) = \frac{53(M-1)}{204 \left\lceil \frac{48M + 16}{184} \right\rceil} \quad (11)$$

where $\lceil (48M+16/184) \rceil$ is the number of packets 216 of an encapsulation section 200, and M−1 is the number of payload cells of an encapsulation section 200.

In general, the larger the M-value, the higher is the efficiency. The trend, however, is not monotonic due to the ceiling function of Equation (11), which is attributed to the padding of unused bytes in packets 216. As a result of this padding, for ATM cells the optimum efficiency is achieved at M=84 and is described by Equation (12):

$$\eta_{opt}(M) = \eta(84) = 98.02\% \quad (12)$$

Near-optimal efficiency may be achieved using certain values of M that are significantly less than 84, for example, M=36 or M=15.

Figure 4:
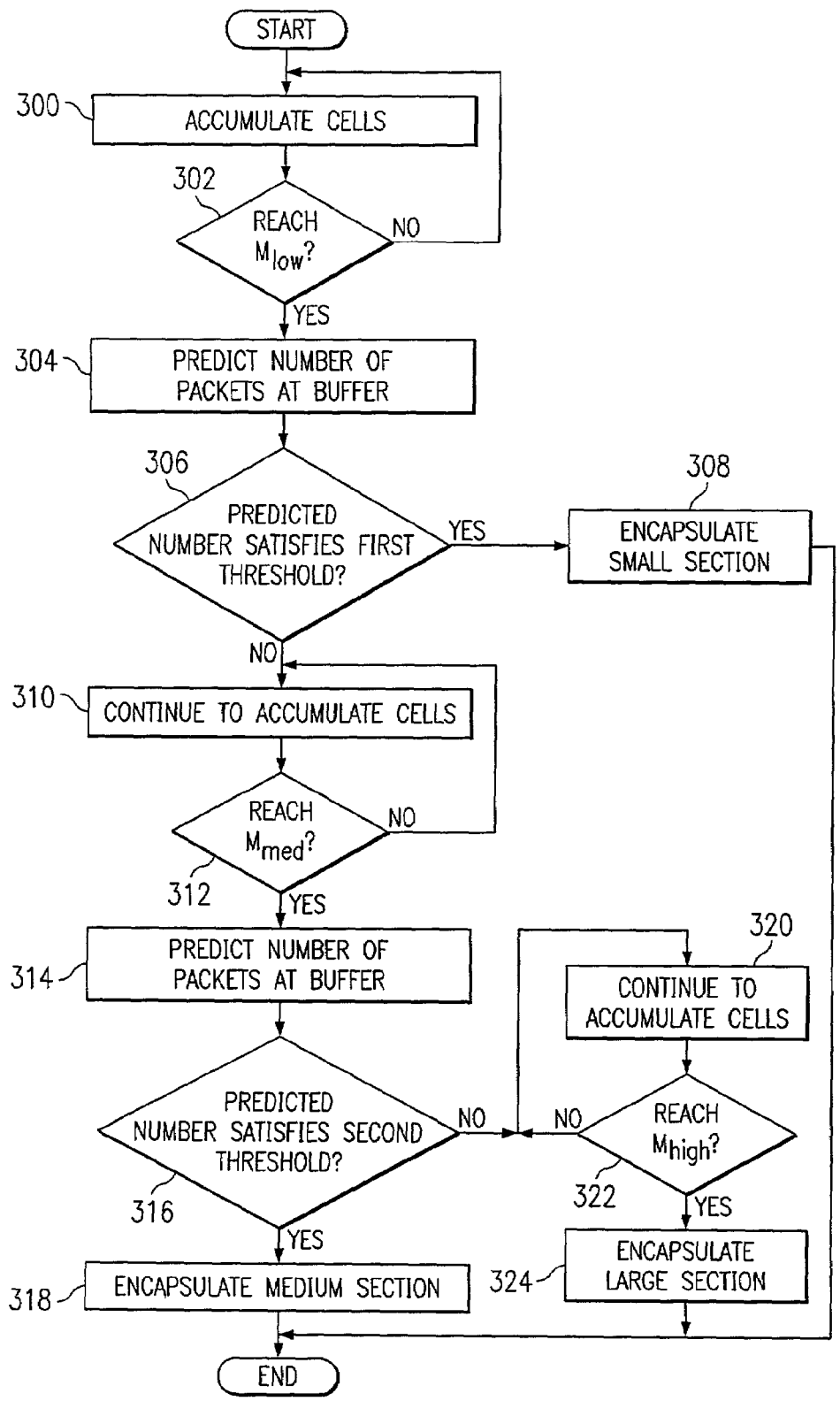
FIG. 4 is a flowchart illustrating a method for encapsulating cells.

FIG. 4 is a flowchart illustrating a method for encapsulating cells. According to the method, each video queue 40 is associated with a number of decision points. In the illustrated example, each video queue 40 is associated with three decision points, $M_{low}$, $M_{medium}$, and $M_{high}$. A decision point refers to a number of cells at a video queue 40. When video queue 40 reaches a decision point, a decision on whether to encapsulate the cells at video queue 40 is made based on the activity at the other video queues 40 and real time buffer 42. Typically, high activity at other video queues 40 and real time buffer 42 indicates the potential for high jitter. If the activity is high, indicating that predicted jitter may be high, then the cells are encapsulated in order to control jitter. If the activity is low, indicating that predicted jitter may be low, encapsulation is deferred in order to gain transmission efficiency. According to one embodiment, each decision point may be associated with an optimized efficiency such that encapsulating the number of cells at the decision point may provide for maximized efficiency. Data without quality of service constraints may be encapsulated at the maximized efficiency, and data with quality of service constraints may be encapsulated at the maximized efficiency with respect to the quality of service constraints.

Activity may be measured by predicting a number of packets $Q_{RT}^{pred}$ at real time buffer 42, which includes the number of packets already at real time buffer 42 plus the number of packets expected to arrive at real time buffer 42 from other video queues 40. Threshold values may be used to determine whether the activity at video queues 40 and real time buffer 42 is sufficient to encapsulate cells. For example, if the number of packets $Q_{RT}^{pred}$ satisfies a threshold value, encapsulation is performed. In the illustrated example, each video queue 40 is associated with a first threshold and a second threshold. The first threshold is used at decision point $M_{low}$ to determine if encapsulation should take place at $M_{low}$ or $M_{med}$, and the second threshold is used at decision point $M_{med}$ to determine whether encapsulation should take place at $M_{med}$ or $M_{high}$.

The method begins at step 300, where cells are accumulated at video queue 40. The number of cells at video queue 40 is checked at step 302. If the number of cells has not reached decision point $M_{low}$, the method returns to step 300 to continue accumulating cells at video queue 40. If the number of cells has reached decision point $M_{low}$, the method proceeds to step 304 to predict the number of packets that will be at real time buffer 42. The number of packets may be predicted according to a method described with reference to FIG. 5. If the predicted number satisfies a first threshold at step 306, the method proceeds to step 308 to encapsulate a small encapsulation section that includes $M_{low}$ cells. After encapsulating the small section, the methods terminates.

If the predicted number does not satisfy a first threshold at step 306, the method proceeds to step 310 to continue to accumulate cells at video queue 40. The number of accumulated cells is checked at step 312. If the number of cells has not reached decision point $M_{med}$, the method returns to step 310 to continue to accumulate cells at video queues 40. If the number of cells has reached decision point $M_{med}$, the method proceeds to step 314 to predict the number of packets at real time buffer 42. If the predicted number satisfies a second threshold at step 316, the method proceeds to step 318 to encapsulate a medium sized encapsulation section. After encapsulating the cells, the method terminates.

If the predicted number does not satisfy the second threshold at step 316, the method proceeds to step 320 to continue to accumulate cells. The number of cells is checked at step 322. If the number of cells has not reached decision point $M_{high}$, the method returns to step 320 to continue to accumulate cells. If the number of cells has reached decision point $M_{high}$, the method proceeds to step 324 to encapsulate a large sized encapsulation section. After encapsulating the cells, the method terminates.

Figure 5:
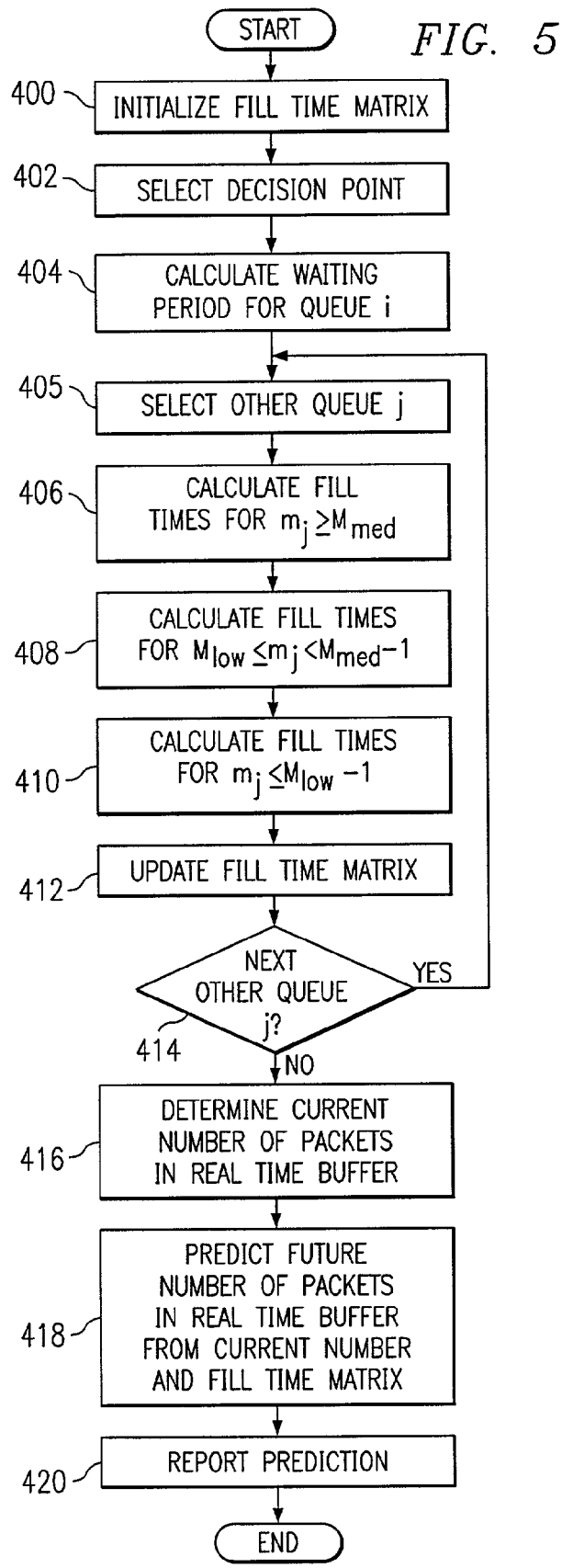
FIG. 5 is a flowchart illustrating a method for predicting jitter.

FIG. 5 is a flowchart illustrating a method for predicting jitter. The method predicts a number of packets $Q_{RT}^{pred}$ at real time buffer 42, which is used to determine whether to encapsulate cells located at queue i. According to the method, a fill time matrix $A_j$ describes the time for other queues j to reach decision points, while taking into account the bandwidth allocated to the flow 20 associated with queue j. The predicted number of packets $Q_{RT}^{pred}$ at real time buffer 42 is determined using the current number of packets and fill time matrix $A_j$.

The method begins at step 400, where fill time matrix $A_j$ is initialized. Each queue j may be associated with a fill time matrix $A_j$ that has two columns. In a completed fill time matrix $A_j$, the first column describes fill times, and the second column describes additional packets 216 produced by each fill. Element $A_j(p, q)$ is the (p, q)th element of $A_j$.

In the illustrated example, the decision points comprise $M_{low}$, $M_{med}$, and $M_{high}$. The decisions are made when the number of cells $M_i$ at queue i reaches $M_{low}-1$ and $M_{med}-1$. A decision point is selected at step 402. If the number of cells $M_i$ at queue i is equal to $M_{low}-1$, a decision is made whether to encapsulate using $M=M_{low}$ or to continue accumulating cells until the next decision point is reached. To determine whether to encapsulate, the impact of waiting for the next decision point on the cell delay variation is assessed.

A waiting period is calculated at step 404. If encapsulation is postponed until $m_i=M_{med}-1$, then in the worst case queue i has to wait for the period $W_{low \to med}^{(i)}$ described by Equation (13):

$$W_{low \to med}^{(i)} = (M_{med}-M_{low})D_{card}^{(i)} = 21D_{card}^{(i)} \text{ seconds} \quad (13)$$

During the waiting period, other queues j may reach their respective decision points and may encapsulate using any of the three M-values. One of the other queues j is selected at step 405 to determine the impact of the activity at queue j on cell delay variation. The maximum number of cells that could arrive at queue j within $W_{low \to med}^{(i)}$ time period is given by $W_{low \to med}^{(i)} R_j/424 = 21 D_{card}^{(i)} R_j/424$. There are three possibilities to be considered, depending on the fill status of queue j: $m_j \geq M_{med}$, $M_{low} \leq m_j < M_{med}-1$, and $m_j < M_{low}-1$.

Fill times for a queue j with $m_j \geq M_{med}$ are calculated at step 406. If $m_j \geq M_{med}$ the next decision point for queue j occurs at $M_{high}$. The earliest time by which such encapsulation could take place is given by $424(M_{high}-m_j-1)/R_j$. Thus, if $W_{low \to med}^{(i)} \geq 424(M_{high}-m_j-1)/R_j$, then in the worst case queue j could generate at least one encapsulation section before queue i reaches its fill level of $M_{med}-1$. If that happens, queue j generates $\lceil (48 \times 84+16)/184 \rceil = 22$ packets 216 into the real time buffer 42, and starts filling again.

In the worst case, subsequent encapsulations at queue j within the $W_{low \to med}^{(i)}$ period are performed using $M_{low}$. Thus, the maximum number of encapsulation sections 200 that may be produced from queue j during the $W_{low \to med}^{(i)}$ period is described by Equation (14):

$$f_{high}(j, W_{low \to med}^{(i)}) = 1 + \left\lfloor \frac{W_{low \to med}^{(i)} R_j/424 - (M_{high}-1-m_j)}{M_{low}-1} \right\rfloor \quad (14)$$

where $\lfloor \cdot \rfloor$ is the floor function. As mentioned above, the first fill results in twenty-two packets 216, and each subsequent fill produces $\lceil (48 \times 15+16)/184 \rceil = 4$ packets 216. The earliest time for producing the first fill occurs after the interval described by Equation (15):

$$T_{high}^{(1)}(j) = \frac{424(M_{high}-m_j-1)}{R_j} \text{ seconds} \quad (15)$$

Subsequent fills occur at intervals described by Equation (16):

$$T_{high}^{(m)}(j) = \frac{424(M_{low}-1)}{R_j} = \frac{5936}{R_j} \text{ seconds for } m = 2, \quad (16)$$
$$3, \ldots, f_{high}(j, W_{low \to med}^{(i)})$$

Fill times for a queue j with $M_{low} \leq m_j < M_{med}-1$ are calculated at step 408. If $M_{low} \leq m_j < M_{med}-1$, the next decision point for queue j occurs at $M_{med}$. The earliest time by which such encapsulation could take place is given by $424(M_{med}-m_j-1)/R_j$ seconds. Thus, if $W_{low \to med}^{(i)} \geq 424(M_{med}-m_j-1)/R_j$, then in the worst case queue j generates at least one encapsulation section before queue i reaches its fill level of $M_{med}-1$. If that happens, queue j generates $\lceil (48 \times 36+16)/184 \rceil = 10$ packets 216 into real time buffer 40, and starts filling again In the worst case, subsequent encapsulations at queue j during $W_{low \to med}^{(i)}$ time period are performed using $M_{low}$. Thus, the maximum number of encapsulation sections 200 that may be produced from queue j during the $W_{low \to med}^{(i)}$ period is described by Equation (17):

$$f_{med}(j, W_{low \to med}^{(i)}) = 1 + \left\lfloor \frac{W_{low \to med}^{(i)} R_j/424 - (M_{med}-1-m_j)}{M_{low}-1} \right\rfloor \quad (17)$$

Except for the first fill which produces ten packets 216, every subsequent fill produces four packets 216. The earliest time for producing the first fill occurs after the interval described by Equation (18):

$$T_{med}^{(1)}(j) = \frac{424(M_{med}-mj-1)}{R_j} \text{ seconds} \quad (18)$$

Subsequent fills occur at intervals described by Equation (19):

$$T_{med}^{(m)}(j) = \frac{424(M_{low}-1)}{R_j} = \frac{5936}{R_j} \text{ seconds for } m = 2, \quad (19)$$
$$3, \ldots, f_{med}(j, W_{low \to med}^{(i)})$$

Fill times for a queue j with $m_j \leq M_{low}-1$ are calculated at step 410. If $m_j \leq M_{low}-1$, the next decision point for queue j occurs at $M_{low}$. The earliest time such encapsulation could take place is given by $424(M_{low}-m_j-1)/R_j$ seconds. Thus, if $W_{low \to med}^{(i)} \geq 424(M_{low}-m_j-1)/R_j$, then in the worst case queue j could generate at least one encapsulation section before queue i reaches its fill level of $M_{med}-1$. If that happens, queue j generates four packets 216 into real time buffer 40, and starts filling again.

In the worst case, subsequent encapsulations of queue j during the $W_{low \to med}^{(i)}$ period are performed using $M_{low}$. Thus, the maximum number of encapsulation sections 200 that may be produced from queue j during the $W_{low \to med}^{(i)}$ period is described by Equation (20):

$$f_{low}(j, W_{low \to med}^{(i)}) = 1 + \left\lfloor \frac{W_{low \to med}^{(i)} R_j / 424 - (M_{low} - 1 - m_j)}{M_{low} - 1} \right\rfloor \quad (20)$$

The earliest time for producing the first fill occurs after the interval described by Equation (20):

$$T_{low}^{(1)}(j) = \frac{424(M_{low} - m_j - 1)}{R_j} \text{ seconds} \quad (21)$$

Subsequent fills occur at intervals described by Equation (22):

$$T_{low}^{(m)}(j) = \frac{424(M_{low} - 1)}{R_j} = \frac{5936}{R_j} \text{ seconds for } m = 2, \quad (22)$$

$$3, \ldots, f_{low}(j, W_{low \to med}^{(i)})$$

Fill matrix $A_j$ for queue j is updated at step 412 with fill times determined at steps 406 through 410. The estimated worst-case scenario for the generation of packets 216 from queues $j=1, \ldots, n_v, j \neq i$ is used to predict the status of real time buffer 42 after the $W_{low \to med}^{(i)}$ time period. The evolution of the number of packets at real time buffer 42 is the same as that of a batch $$\sum_{k=1}^{n_v - 1} D_k / D / 1$$

queuing system with known starting times and heterogeneous inputs, that is, where the interarrival times of each input are deterministic but vary from one input to another. Except for the first fill of each input, the batch size is fixed at four packets. In the illustrated example, the time to serve a packet is given by $1632/R_{encap}$ seconds, which is selected as a time slot. The first column of each matrix $A_j$ may be normalized so that the time for each fill is indicated in the number of time slots. The floor function may be taken to produce an integer number of time slots.

If there is a next other queue j at step 414, the method returns to step 405 to select the next other queue j. If there is no next other queue j at step 414, the method proceeds to step 416 to determine the current number of packets $Q_{RT}$ in real time buffer 40. The future number of packets $Q_{RT}^{pred}$ after $W_{low \to med}^{(i)} R_{encap}/1632$ time slots is predicted using the current number of packets $Q_{RT}$ at step 418. The growth of real time buffer 42 may be simulated for the number of time slots using fill time matrix $A_j$ for j, $j \neq i$. The following procedure may be used to predict $Q_{RT}^{pred}$. In the procedure, the parameter next_fill[j] provides the index to the next fill time at queue j.

```
initialize Q_RT^pred := Q_RT
set S_max := W_low→med^(i) R_encap/1632 /* maximum number of slots */
for j = 1, ..., n_v, j ≠ i, do
    set next_fill[j] = 1
```

```
end-for
for t = 1, 2, ..., S_max, do
    for j = 1, 2, ..., n_v, j ≠ i, do
        if A_j (next_fill[j], 1) = t
            Q_RT^pred := Q_RT^pred + A_j(next_fill[j], 2)
            increment next_fill[j]
        end-if
    end-for
    Q_RT^pred := Q_RT^pred - 1
end-for
```

The worst-case extra delay caused by postponing encapsulation at queue i may be estimated using Equation (23):

$$d_{low \to med}^{(i)} = \frac{(8)(204)(Q_{RT}^{pred} - Q_{RT})}{R_{encap}} + D_{card}^{(i)}(M_{med} - M_{low}) \quad (23)$$

The prediction is reported at step 420. The decision whether to encapsulate using $M_{low}$ or not can be made by comparing $Q_{RT}^{pred}$ to a threshold $N_{low \to med}$ described by Equation (24):

$$N_{low \to med} \stackrel{def}{=} \sum_{\substack{j=1 \\ j \neq i}}^{n_v} \left\lceil \frac{48 M_{med} + 16}{184} \right\rceil = \sum_{\substack{j=1 \\ j \neq i}}^{n_v} \left\lceil \frac{48(36) + 16}{184} \right\rceil = 10(n_v - 1) \quad (24)$$

If $Q_{RT}^{pred} \geq N_{low \to med}$, encapsulation section 200 is formed using $M_{low}$. Otherwise, encapsulation is postponed until the next decision point. After reporting the predicted value, the method terminates.

If decision point $M_{med}$ is selected at step 402, the decision was made to not encapsulate using $M_{low}$, but to wait until $m_i = M_{med} - 1$. At $m_i = M_{med} - 1$, a decision is made whether to proceed with encapsulation using $M_{med}$ or to wait until $m_i = M_{high} - 1$. The basis for making such a decision depends on the impact of waiting on the cell delay variation at encapsulator 30.

A waiting period is calculated at step 404. If encapsulation is postponed until $m_i = M_{high} - 1$, then in the worst case queue i has to wait for the period $W_{med \to high}^{(i)}$ described by Equation (25):

$$W_{med \to high}^{(i)} = (M_{high} - M_{med}) D_{card}^{(i)} = 48 D_{card}^{(i)} \text{ seconds} \quad (25)$$

During the waiting period, other queues j may reach their respective fill levels and may encapsulate using any of the three M-values. One of the other queues j is selected at step 405 to determine the impact of the activity at queue j on cell delay variation. The maximum number of cells that could arrive at queue j within the $W_{med \to high}^{(i)}$ time period is given by $W_{med \to high}^{(i)} R_j / 424 = 48 D_{card}^{(i)} R_j / 424$. There are three possibilities to be considered depending on the fill status of queue j: $m_j \geq M_{med}$, $M_{low} \leq m_j < M_{med}$, $m_j < M_{low}$.

Fill times for $m_j \geq M_{med}$ are calculated at step 406. If $m_j \geq M_{med}$, the next decision point for queue j occurs at $M_{high}$. The earliest time by which such encapsulation could take place is given by $424(M_{high} - m_j - 1)/R_j$. If $W_{med \to high}^{(i)} \geq 424(M_{high} - m_j - 1)/R_j$, then queue j generates a maximum of $f_{high}(j, W_{med \to high}^{(i)})$ encapsulation sections 200 within the $W_{med \to high}^{(i)}$ period, where $f_{high}$ is described by Equation (26):

$$f_{high}(j, W_{med \to high}^{(i)}) = 1 + \left\lfloor \frac{W_{med \to high}^{(i)} R_j / 424 - (M_{high} - 1 - m_j)}{M_{low} - 1} \right\rfloor \quad (26)$$

As discussed previously, the first encapsulation section has twenty-two packets 216, while each subsequent encapsulation section has four packets 216. At best, encapsulation sections are generated at times $T_{high}^{(1)}(j)$, $T_{high}^{(1)}(j)+T_{high}^{(2)}(j)$, $T_{high}^{(1)}(j)+T_{high}^{(2)}(j)+T_{high}^{(3)}(j)$, ..., where $T_{high}^{(m)}(j)$ is described by Equations (15) and (16), for m=1 and m>1, respectively.

Fill times for $M_{low} \leq m_j < M_{med}-1$ are calculated at step 408. If $W_{med \to high}^{(i)} \geq 424(M_{med}-m_j-1)/R_j$, then in the worst case queue j produces at least one encapsulation section within a $W_{med \to high}^{(i)}$ period, and may produce a maximum of $f_{med}(j, W_{med \to high}^{(i)})$ encapsulation sections, where $f_{med}$ is described by Equation (27):

$$f_{med}(j, W_{med \to high}^{(i)}) = 1 + \left\lfloor \frac{W_{med \to high}^{(i)} R_j / 424 - (M_{med} - 1 - m_j)}{M_{low} - 1} \right\rfloor \quad (27)$$

The first encapsulation section 200 yields ten packets 216 in real time buffer 40, while each subsequent encapsulation section 200 yields four packets 216 in real time buffer 40. The inter-generation times of the encapsulation sections from the queue j are given in Equations (18) and (19).

Fill times for $m_j \leq M_{low}-1$ are calculated at step 410. If $W_{med \to high}^{(i)} \geq 424(M_{low}-m_j-1)/R_j$, then in the worst case the queue j generates a maximum of $f_{low}(j, W_{med \to high}^{(i)})$ encapsulation sections before the queue i reaches its fill level of $M_{high}-1$, where $f_{low}$ is described by Equation (28):

$$f_{low}(j, W_{med \to high}^{(i)}) = 1 + \left\lfloor \frac{W_{med \to high}^{(i)} R_j / 424 - (M_{low} - 1 - m_j)}{M_{low} - 1} \right\rfloor \quad (28)$$

Each encapsulation section 200 is packetized in four packets 216. The generation times for these encapsulation sections may be obtained from Equations (21) and (22). Information about fill times and the potential number of generated packets is stored in fill time matrix $A_j$ at step 412. If there is a next other queue j at step 414, the method returns to step 405 to select the next other queue j. If there is no next other queue j at step 414, the method proceeds to step 416.

The current number $Q_{RT}$ of packets in real time buffer 42 is determined at step 416. The predicted number $Q_{RT}^{pred}$ packets in real time buffer 42 is predicted at step 418 from the current number $Q_{RT}$ and the fill matrices. The procedure described previously, but with $W_{med \to high}^{(i)}$ replacing $W_{low \to med}^{(i)}$ in the second line, may be used to compute the predicted number $Q_{RT}^{pred}$ representing the number of cells after $W_{med \to high}^{(i)}$ period. Once $Q_{RT}^{pred}$ is obtained, the worst-case extra delay caused by postponing the encapsulation decision at queue i may be estimated using Equation (29):

$$d_{med \to high}^{(i)} = \frac{(8)(204)(Q_{RT}^{pred} - Q_{RT})}{R_{encap}} + D_{card}^{(i)}(M_{high} - M_{med}) \quad (29)$$

The predicted value is reported at step 420. The decision whether to encapsulate using $M_{med}$ or not may be made by comparing $Q_{RT}^{pred}$ to the threshold $N_{med \to high}$, described by Equation (30):

$$N_{med \to high} \overset{def}{=} \sum_{\substack{j=1 \\ j \neq i}}^{n_v} \left\lceil \frac{48 M_{low} + 16}{184} \right\rceil = \sum_{j=1, j \neq i}^{n_v} \left\lceil \frac{48(15) + 16}{184} \right\rceil = 4(n_v - 1) \quad (30)$$

If $Q_{RT}^{pred} \geq N_{med \to high}$, an encapsulation section is formed using $M_{med}$ cells. Otherwise, encapsulation is postponed until $m_i = M_{high}-1$. After reporting the predicted value, the method terminates.

Encapsulating cells according to the illustrated method may reduce jitter while maintaining efficiency. If an encapsulation section 200 from queue i is formed using $M_{low}$ cells, then the worst-case interdeparture time at the output of encapsulator 30 may be obtained using Equation (8) by substituting $M_{low}$ for $M_i(1+k)$, $M_{high}$ for $M_j$, and $M_{low}$ for $M_i(k)$, yielding Equation (31):

$$(D_{encap}^{(i)})_{low} = 14 D_{card}^{(i)} + \frac{1632}{R_{encap}} \left\{ \sum_{j \neq i} \left\lceil \frac{(48)(84) + 16}{184} \right\rceil - \left\lceil \frac{(48)(15) + 16}{184} \right\rceil + 1.647 \right\} \quad (31)$$

$$= 14 D_{card}^{(i)} + \frac{1632}{R_{encap}}(22 n_v - 24.353)$$

If encapsulation is postponed until $m_i = M_{med}-1$, then the worst-case interdeparture time is upper bounded as described by Equation (32):

$$(D_{encap}^{(i)})_{med} = (M_{med} - 1) D_{card}^{(i)} + \frac{1632}{R_{encap}} \left\{ Q_{RT}^{pred} - \left\lceil \frac{(48)(15) + 16}{184} \right\rceil + 1.647 \right\} \quad (32)$$

$$\leq 35 D_{card}^{(i)} + \frac{1632}{R_{encap}} \{10(n_v - 1) - 2.353\}$$

$$= 35 D_{card}^{(i)} + \frac{1632}{R_{encap}}(10 n_v - 12.353)$$

The first term of the right-hand side of Equation (32) is the result of having to wait for the arrival of $M_{med}-1$ cells before encapsulation. The other terms account for the impact of encapsulation sections 200 from queues j other than queue i and for the impact of the previous encapsulation section 200 from queue i.

Finally, if encapsulation is postponed until $m_i = M_{high}-1$, then the worst-case interdeparture time is upper bounded as described by Equation (33):

$$\begin{aligned}(D_{encap}^{(i)})_{high} &= (M_{high} - 1)D_{card}^{(i)} + \frac{1632}{R_{encap}}\left\{Q_{RT}^{pred} - \left\lceil\frac{(48)(15)+16}{184}\right\rceil + 1.647\right\} \\ &\leq 83 D_{card}^{(i)} + \frac{1632}{R_{encap}}\{4(n_v - 1) - 2.353\} \\ &= 83 D_{card}^{(i)} + \frac{1632}{R_{encap}}(4n_v - 6.353)\end{aligned} \quad (33)$$

The worst-case cell delay variation for the M-values may be obtained from Equation (9) by replacing $D_{encap}^{(i)}$ by the corresponding worst-case interdeparture time at the given M-value. The reduction in cell delay variation is the highest when $M_{low}$ is used and the lowest when $M_{high}$ is used. The average reduction in cell delay variation depends on the distribution of encapsulation sections 200 that are encapsulated using $M_{low}$, $M_{med}$, and $M_{high}$, which in turn depends on the traffic conditions, because the heavier the load, the higher is the tendency to encapsulate using a larger M-value. If the load is light for a large fraction of the time, then most of the encapsulation sections are encapsulated using $M_{high}$ and to a lesser extent $M_{med}$.

If the resulting cell delay variation bounds are too loose, then one can control these bounds for both $M_{med}$ and $M_{high}$ by modifying the values of $N_{low \to med}$ and $N_{med \to high}$. For example, using a smaller value for $N_{low \to med}$ than the one used in Equation (24) increases the number of encapsulation sections that are encapsulated using $M_{low}$, and hence decreases the average worst-case cell delay variation. According to one embodiment, the sizes of the encapsulation sections may be monitored, and the thresholds $N_{low \to med}$ and $N_{med \to high}$ may be adjusted so that a desired cell delay variation performance may be provided.

Certain embodiments of the invention may provide one or more technical advantages. A technical advantage of one embodiment may be that the number of cells to be encapsulated is adjusted in response to predicted jitter in an effort to control jitter while maintaining efficiency. If the predicted jitter is high, fewer cells are encapsulated to control jitter. If the predicted jitter is too low, more cells are encapsulated to maintain efficiency. Another technical advantage of one embodiment may provide prediction of jitter by estimating the number of cells at a buffer at a given time. If the predicted number of cells is high, the jitter is predicted to be high. If the predicted number of cells is low, then the jitter is predicted to be low.

Although an embodiment of the invention and its advantages are described in detail, a person skilled in the art could make various alterations, additions, and omissions without departing from the spirit and scope of the present invention as defined by the appended claims.

What is claimed is:

1. A method for encapsulating cells, comprising:
   receiving a plurality of cells at a queue of a transmitter, the queue associated with a plurality of decision points, each decision point corresponding to a number of cells, each decision point associated with a threshold criterion;
   repeating the following until satisfying a threshold criterion:
      accumulating at the queue a number of cells corresponding to a decision point;
      predicting jitter associated with the cells;
      determining whether the predicted jitter satisfies the threshold criterion associated with the decision point;
      sending the cells to a buffer of the transmitter if the predicted jitter satisfies the threshold criterion; and
      continuing to accumulate at the queue a number of cells corresponding to a next decision point; and
   encapsulating the cells at the buffer for transmission.

2. The method of claim 1, wherein:
   predicting jitter associated with the cells comprises predicting a number of packets at the buffer; and
   determining whether the predicted jitter satisfies the threshold criterion associated with the decision point comprises determining whether the predicted number satisfies the threshold criterion, the threshold criterion describing a threshold number of packets at the buffer.

3. The method of claim 1, wherein predicting jitter associated with the cells comprises:
   accessing a fill time matrix associated with another queue, the fill time matrix comprising a plurality of fill times, each fill time associated with a set of packets sent to the buffer from the other queue;
   determining a current number of packets at the buffer; and
   predicting the number of packets according to the current number of packets at the buffer and the fill time matrix in order to predict the jitter associated with the cells.

4. The method of claim 1, wherein predicting jitter associated with the cells comprises:
   accessing a plurality of fill time matrices associated with a plurality of other queues, each fill time matrix comprising a plurality of fill times, each fill time associated with a set of packets sent to the buffer from the associated other queue;
   determining a current number of packets at the buffer; and
   predicting the number of packets according to the current number of packets at the buffer and the fill time matrices in order to predict the jitter associated with the cells.

5. The method of claim 1, further comprising calculating a fill time matrix associated with another queue by:
   calculating a waiting period between encapsulating at a current decision point and encapsulating at a next decision point;

determining information about a plurality of sets of packets sent to the buffer from the other queue during the waiting period, each set of packets associated with a fill time; and storing the information in the fill time matrix, the fill time matrix used to predict the jitter associated with the cells.

6. The method of claim 1, wherein encapsulating the cells at the buffer comprises encapsulating the cells to generate a multi-protocol encapsulation section.

7. The method of claim 1, wherein encapsulating the cells at the buffer comprises:

generating an encapsulation section by adding a section header and a section footer to the cells; and packetizing the encapsulation section into a plurality of packets, each packet comprising a packet header and a packet footer.

8. The method of claim 1, wherein:

each decision point comprises an optimized efficiency; and encapsulating the cells at the buffer comprises encapsulating the cells at a maximized efficiency.

9. The method of claim 1, wherein the cells comprise traffic selected from a group consisting of video traffic, voice traffic, and real-time traffic.

10. A system for encapsulating cells, comprising:

a queue of a transmitter, the queue operable to receive a plurality of cells, the queue associated with a plurality of decision points, each decision point corresponding to a number of cells, each decision point associated with a threshold criterion; and a processor coupled to the queue and operable to:

repeat the following until satisfying a threshold criterion:

accumulating at the queue a number of cells corresponding to a decision point;

predicting jitter associated with the cells;

determining whether the predicted jitter satisfies the threshold criterion associated with the decision point;

sending the cells to a buffer of the transmitter if the predicted jitter satisfies the threshold criterion; and continuing to accumulate at the queue a number of cells corresponding to a next decision point; and encapsulate the cells at the buffer for transmission.

11. The system of claim 10, wherein the processor operates to:

predict jitter associated with the cells comprises predicting a number of packets at the buffer; and determine whether the predicted jitter satisfies the threshold criterion associated with the decision point comprises determining whether the predicted number satisfies the threshold criterion, the threshold criterion describing a threshold number of packets at the buffer.

12. The system of claim 10, wherein the processor operates to predict jitter associated with the cells by:

accessing a fill time matrix associated with another queue, the fill time matrix comprising a plurality of fill times, each fill time associated with a set of packets sent to the buffer from the other queue;

determining a current number of packets at the buffer; and predicting the number of packets according to the current number of packets at the buffer and the fill time matrix in order to predict the jitter associated with the cells.

13. The system of claim 10, wherein the processor operates to predict jitter associated with the cells by:

accessing a plurality of fill time matrices associated with a plurality of other queues, each fill time matrix comprising a plurality of fill times, each fill time associated with a set of packets sent to the buffer from the associated other queue;

determining a current number of packets at the buffer; and predicting the number of packets according to the current number of packets at the buffer and the fill time matrices in order to predict the jitter associated with the cells.

14. The system of claim 10, wherein the processor operates to calculate a fill time matrix associated with another queue by:

calculating a waiting period between encapsulating at a current decision point and encapsulating at a next decision point;

determining information about a plurality of sets of packets sent to the buffer from the other queue during the waiting period, each set of packets associated with a fill time; and storing the information in the fill time matrix, the fill time matrix used to predict the jitter associated with the cells.

15. The system of claim 10, wherein the processor operates to encapsulate the cells at the buffer by encapsulating the cells to generate a multi-protocol encapsulation section.

16. The system of claim 10, wherein the processor operates to encapsulate the cells at the buffer by:

generating an encapsulation section by adding a section header and a section footer to the cells; and packetizing the encapsulation section into a plurality of packets, each packet comprising a packet header and a packet footer.

17. The system of claim 10, wherein:

each decision point comprises an optimized efficiency; and the processor is operable to encapsulate the cells at the buffer by encapsulating the cells at a maximized efficiency.

18. The system of claim 10, wherein the cells comprise traffic selected from a group consisting of video traffic, voice traffic, and real-time traffic.

19. A system for encapsulating cells, comprising:

means for receiving a plurality of cells at a queue of a transmitter, the queue associated with a plurality of decision points, each decision point corresponding to a number of cells, each decision point associated with a threshold criterion;

means for repeating the following until satisfying a threshold criterion:

accumulating at the queue a number of cells corresponding to a decision point;

predicting jitter associated with the cells;

determining whether the predicted jitter satisfies the threshold criterion associated with the decision point;

sending the cells to a buffer of the transmitter if the predicted jitter satisfies the threshold criterion; and continuing to accumulate at the queue a number of cells corresponding to a next decision point;

means for encapsulating the cells at the buffer for transmission.

20. A method for encapsulating cells, comprising:

receiving a plurality of cells at a queue of a transmitter, the queue associated with a plurality of decision points, each decision point corresponding to a number of cells, each decision point associated with a threshold criterion describing a threshold number of packets at a buffer of the transmitter;

calculating a plurality of fill time matrices associated with a plurality of other queues by calculating a waiting period between encapsulating at a current decision point and encapsulating at a next decision point, determining information about a plurality of sets of packets sent to the buffer from the other queue during the waiting period, each set of packets associated with a fill time, and storing the information in the fill time matrix;

repeating the following until satisfying a threshold criterion:
    accumulating at the queue a number of cells corresponding to a decision point;
    predicting jitter associated with the cells by predicting a number of packets at the buffer by accessing the fill time matrices, determining a current number of packets at the buffer, and predicting the number of packets according to the current number of packets at the buffer and the fill time matrices in order to predict the jitter associated with the cells;
    determining whether the predicted number satisfies the threshold criterion;
    sending the cells to the buffer if the predicted jitter satisfies the threshold criterion; and
    continuing to accumulate at the queue a number of cells corresponding to a next decision point; and encapsulating the cells at the buffer for transmission by generating an encapsulation section by adding a section header and a section footer to the cells, and packetizing the encapsulation section into a plurality of packets, each packet comprising a packet header and a packet footer.

* * * * *

UNITED STATES PATENT AND TRADEMARK OFFICE
CERTIFICATE OF CORRECTION

PATENT NO.         : 7,013,318 B2
APPLICATION NO. : 10/158351
DATED                  : March 14, 2006
INVENTOR(S)       : Phillip I. Rosengard and Marwan M. Krunz It is certified that error appears in the above-identified patent and that said Letters Patent is hereby corrected as shown below:

Column 9, Line 25:

Delete " $W^{(i)}_{low \to med} = (M_{med} - M_{low})D^{(i)}_{card} = 21D^{(i)}_{card}$ " and insert -- $W_{low \to med}^{(i)} = (M_{med} - M_{low})D_{card}^{(i)} = 21D_{card}^{(i)}$ --.

Column 11, Line 53:

After "packets" delete " $Q_{RT}^{pred}$ after $W_{low \to med}^{(i)}$ " and insert -- $Q_{RT}^{pred}$ after $W_{low \to med}^{(i)}$ --.

Column 11, Line 58:

After "predict" delete " $Q_{RT}^{pred}$ " and insert -- $Q_{RT}^{pred}$ --.

Column 12, Line 23:

After "comparing" delete " $Q_{RT}^{pred}$ " and insert -- $Q_{RT}^{pred}$ --.

Column 12, Line 32:

After "If" delete " $Q_{RT}^{pred}$ " and insert -- $Q_{RT}^{pred}$ --.

Column 12, Line 46:

After "period" delete " $W_{med \to high}^{(i)}$ " and insert -- $W_{med \to high}^{(i)}$ --.

UNITED STATES PATENT AND TRADEMARK OFFICE
CERTIFICATE OF CORRECTION

PATENT NO. : 7,013,318 B2
APPLICATION NO. : 10/158351
DATED : March 14, 2006
INVENTOR(S) : Phillip I. Rosengard and Marwan M. Krunz It is certified that error appears in the above-identified patent and that said Letters Patent is hereby corrected as shown below:

Column 12, Line 48:

After "Equation 25" delete "$W_{med \rightarrow high}^{(i)} = (M_{high} - M_{med})D_{card}^{(l)} = 48 D_{card}^{(l)}$" and insert -- $W_{med \rightarrow high}^{(i)} = (M_{high} - M_{med})D_{card}^{(i)} = 48 D_{card}^{(i)}$ --.

Column 12, Line 57:

After "given by" delete "$W_{med \rightarrow high}^{(i)} R_j / 424 = 48 D_{card}^{(i)} R_j / 424$" and insert -- $W_{med \rightarrow high}^{(i)} R_j / 424 = 48 D_{card}^{(i)} R_j / 424$ --.

Column 12, Line 63:

After "if" delete "$W_{med \rightarrow high}^{(i)}$" and insert -- $W_{med \rightarrow high}^{(i)}$ --.

Column 12, Line 65:

After "$f_{high}(j,$" "$W_{med \rightarrow high}^{(i)})$" and insert -- $W_{med \rightarrow high}^{(i)})$ --.

Column 12, Line 66:

Delete "$W_{med \rightarrow high}^{(i)}$" and insert -- $W_{med \rightarrow high}^{(i)}$ --.

Column 13, Line 10:

After "at times" delete "$T_{high}^{(1)}(j), T_{high}^{(1)}(j) + T_{high}^{(2)}(j),$ $T_{high}^{(1)}(j) + T_{high}^{(2)}(j) + T_{high}^{(3)}(j), \ldots,$ where $T_{high}^{(m)}(j)$" and insert -- $T_{high}^{(1)}(j), T_{high}^{(1)}(j) + T_{high}^{(2)}(j), T_{high}^{(1)}(j) + T_{high}^{(2)}(j) + T_{high}^{(3)}(j), \ldots,$ where $T_{high}^{(m)}(j)$ --.

UNITED STATES PATENT AND TRADEMARK OFFICE
CERTIFICATE OF CORRECTION

PATENT NO. : 7,013,318 B2
APPLICATION NO. : 10/158351
DATED : March 14, 2006
INVENTOR(S) : Phillip I. Rosengard and Marwan M. Krunz It is certified that error appears in the above-identified patent and that said Letters Patent is hereby corrected as shown below:

Column 14, Line 9:

After "number" delete "$Q_{RT}{}^{pred}$" and insert -- $Q_{RT}^{pred}$ --.

Column 14, Line 10:

After "after" delete "$W_{med \to high}{}^{(i)}$" and insert -- $W_{med \to high}^{(i)}$ -- and after "Once" delete "$Q_{RT}{}^{pred}$" and insert -- $Q_{RT}^{pred}$ --.

Column 14, Line 23:

After "comparing" delete "$Q_{RT}{}^{pred}$" and insert -- $Q_{RT}^{pred}$ --.

Column 14, Line 34:

After "If" delete "$Q_{RT}{}^{pred}$" and insert -- $Q_{RT}^{pred}$ --.

Column 15, Line 23:

After "replacing" delete "$D_{encap}{}^{(i)}$" and insert -- $D_{encap}^{(i)}$ --.

Signed and Sealed this

Twenty-fourth Day of June, 2008

JON W. DUDAS
*Director of the United States Patent and Trademark Office*